United States Patent
Hashimoto et al.

(10) Patent No.: US 9,025,216 B2
(45) Date of Patent: May 5, 2015

(54) IMAGE READING APPARATUS, IMAGE FORMING APPARATUS, AND IMAGE READING METHOD

(71) Applicants: Hideki Hashimoto, Kanagawa (JP); Masamoto Nakazawa, Kanagawa (JP)

(72) Inventors: Hideki Hashimoto, Kanagawa (JP); Masamoto Nakazawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/138,791

(22) Filed: Dec. 23, 2013

(65) Prior Publication Data
US 2014/0204432 A1    Jul. 24, 2014

(30) Foreign Application Priority Data
Jan. 24, 2013 (JP) ................................. 2013-011466

(51) Int. Cl.
*H04N 1/04* (2006.01)
*H04N 1/00* (2006.01)
*H04N 1/32* (2006.01)

(52) U.S. Cl.
CPC ....... *H04N 1/00798* (2013.01); *H04N 1/00933* (2013.01); *H04N 1/32475* (2013.01); *H04N 2201/0081* (2013.01)

(58) Field of Classification Search
CPC .......... H04N 1/00798; H04N 1/00933; H04N 1/32475; H04N 2201/0081
USPC .................................. 358/482, 475, 474, 498
See application file for complete search history.

(56) References Cited

U.S. PATENT DOCUMENTS

| | | |
|---|---|---|
| 2007/0188638 A1 | 8/2007 | Nakazawa et al. |
| 2008/0252787 A1 | 10/2008 | Nakazawa et al. |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2012/0008173 A1 | 1/2012 | Konno et al. |

(Continued)

FOREIGN PATENT DOCUMENTS

| | | | |
|---|---|---|---|
| JP | 2005-326340 | * 11/2005 | ............. G01B 11/00 |
| JP | 2010-103911 | 5/2010 | |

(Continued)

OTHER PUBLICATIONS
U.S. Appl. No. 13/912,341, filed Jun. 7, 2013.

*Primary Examiner* — Houshang Safaipour
(74) *Attorney, Agent, or Firm* — Oblon, McClelland, Maier & Neustadt, L.L.P.

(57) ABSTRACT

An image reading apparatus includes: light-receiving elements arranged in a main-scanning direction to perform photoelectric conversion pixel by pixel; AD converter units that convert each piece of analog data photoelectric-converted by the light-receiving elements into parallel pieces of digital data; a storage unit that stores therein each of the digital data converted by the AD converter units; a converter unit that reads the digital data stored in the storage unit and converts the read digital data into serial data in the main-scanning direction; a readout control unit that changeably controls a readout start pixel and a readout end pixel of the serial data in the main-scanning direction; and a period change unit that changes a period in which the converter unit converts digital data into serial data in the main-scanning direction based on the readout start pixel and the readout end pixel.

12 Claims, 11 Drawing Sheets

(56) References Cited

U.S. PATENT DOCUMENTS

2012/0092732 A1    4/2012    Nakazawa
2012/0224205 A1    9/2012    Nakazawa
2013/0063792 A1    3/2013    Nakazawa

FOREIGN PATENT DOCUMENTS

JP    2011-244057    12/2011
JP    2012-078141    4/2012

* cited by examiner

FIG.6

| | SCHEME 0 | SCHEME 1 | SCHEME 2 | SCHEME 3 | SCHEME 4 | SCHEME 5 |
|---|---|---|---|---|---|---|
| [rdout_sel] SETTING | 0h | 1h | 2h | 3h | 4h | 5h |
| READOUT START PIXEL REFLECTED REGISTER | [rdout_str_0] | [rdout_str_1] | [rdout_str_2] | [rdout_str_3] | [rdout_str_4] | [rdout_str_5] |
| READOUT END PIXEL REFLECTED REGISTER | [rdout_end_0] | [rdout_end_1] | [rdout_end_2] | [rdout_end_3] | [rdout_end_4] | [rdout_end_5] |
| LINE PERIOD REGISTER | [lineint_0] | [lineint_1] | [lineint_2] | [lineint_3] | [lineint_4] | [lineint_5] |
| APPLICATION EXAMPLES | FOR READING A3 SHORTER SIDE | FOR READING A4 SHORTER SIDE | FOR READING A5 SHORTER SIDE | FOR READING B4 SHORTER SIDE | FOR READING B5 SHORTER SIDE | FOR READING B6 SHORTER SIDE |

IMAGE READING APPARATUS, IMAGE FORMING APPARATUS, AND IMAGE READING METHOD

CROSS-REFERENCE TO RELATED APPLICATIONS

The present application claims priority to and incorporates by reference the entire contents of Japanese Patent Application No. 2013-011466 filed in Japan on Jan. 24, 2013.

BACKGROUND OF THE INVENTION

1. Field of the Invention

The present invention relates to an image reading apparatus, an image forming apparatus, and an image reading method.

2. Description of the Related Art

Conventionally, the image reading apparatus has been adapted to convert, into a voltage, charges accumulated by allowing light-receiving elements such as a plurality of photodiodes to receive light and then sequentially convert the voltage from analog to digital, whereby a plurality of pieces of pixel data are sequentially outputted and the pixel data is collected line by line in the main-scanning direction in order to read an image. In short, in order to obtain one line of image data, all the pixel data had to be sequentially outputted pixel by pixel in the main-scanning direction.

On the other hand, in Japanese Patent Application Laid-Open No. 2012-78141, there is disclosed a displacement sensor which has an additional function for changing the start position for reading an image in order to change the range of reading the image.

However, the above-mentioned conventional art has a problem that required pixels can not be read with efficiency.

In view of the above described problems, there is need to provide an image reading apparatus, an image forming apparatus, and an image reading method which can read required pixels with efficiency.

SUMMARY OF THE INVENTION

It is an object of the present invention to at least partially solve the problems in the conventional technology.

According to the present invention, there is provided: an image reading apparatus comprising: a plurality of light-receiving elements configured to be arranged side by side in a main-scanning direction and perform photoelectric conversion pixel by pixel; a plurality of AD converter units configured to convert each piece of analog data photoelectric-converted by the plurality of light-receiving elements into parallel pieces of digital data; a storage unit configured to store therein each of the parallel pieces of digital data converted by the plurality of AD converter units; a converter unit configured to read the digital data stored in the storage unit and convert the read digital data into serial data in the main-scanning direction; a readout control unit configured to changeably control a readout start pixel and a readout end pixel of the serial data converted by the converter unit in the main-scanning direction; and a period change unit configured to change a period in which the converter unit converts digital data into serial data in the main-scanning direction based on the readout start pixel and the readout end pixel controlled by the readout control unit.

The present invention also provides an image forming apparatus including an image reading apparatus, wherein, as the image reading apparatus, the above-defined image reading apparatus is used.

The present invention also provides a method for reading an image, the method comprising: converting each piece of analog data photoelectric-converted pixel by pixel by a plurality of light-receiving elements arranged side by side in a main-scanning direction into parallel pieces of digital data; storing each of the converted parallel pieces of digital data; changeably controlling a readout start pixel and a readout end pixel in the main-scanning direction; reading the stored digital data from the controlled readout start pixel to the controlled readout end pixel and converting the read digital data into serial data in the main-scanning direction; and changing a period in which the digital data is converted into serial data in the main-scanning direction based on the controlled readout start pixel and the controlled readout end pixel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a view illustrating a plurality of examples of setting values, such as readout start pixels and readout end pixels, which the image reading apparatus stores in a register or the like.

DETAILED DESCRIPTION OF THE PREFERRED EMBODIMENTS

Figure 1:
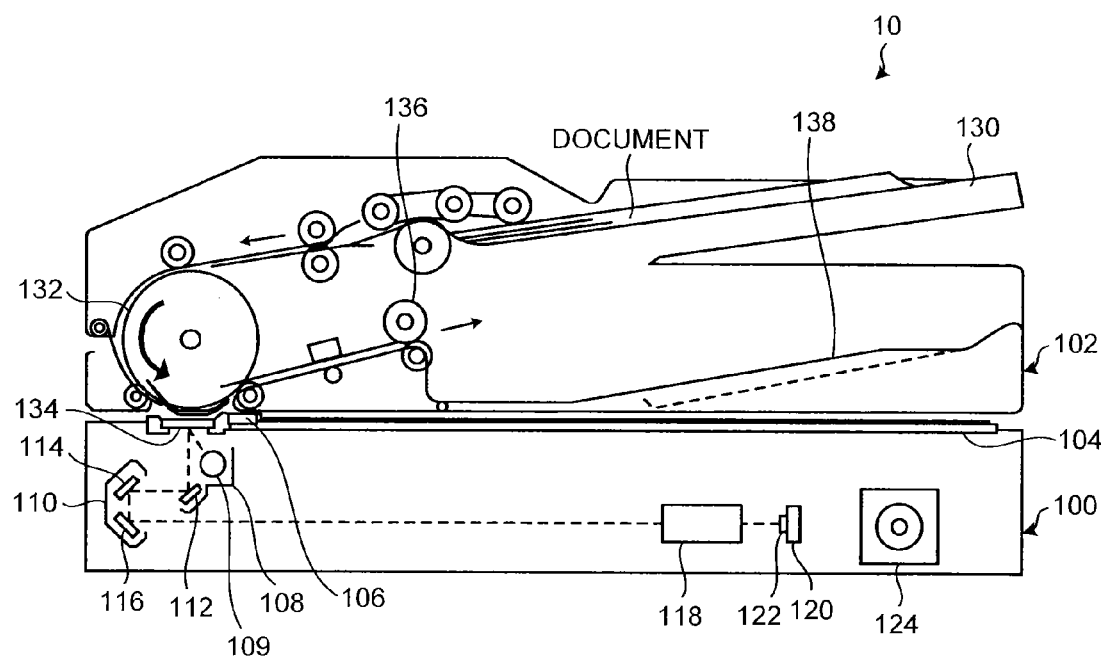
FIG. 1 is a side view schematically illustrating an image reading apparatus according to an embodiment.

Now, embodiments of an image reading apparatus will be described in more detail with reference to the attached drawings. FIG. 1 is a side view schematically illustrating an image reading apparatus 10 according to an embodiment. The image reading apparatus 10, for example, of a sheet through type, has a reader-main-body 100 (flat-bed scanner) and an automatic document feeder (ADF) 102.

The reader-main-body 100 includes a contact glass plate 104, a white reference plate 106, a first carriage 108, a second carriage 110, a lens 118, a CMOS linear sensor 122 provided on a sensor board 120, and a scanner motor 124. The first carriage 108 includes a light source 109 and a mirror 112. The second carriage 110 includes mirrors 114 and 116. Furthermore, the reader-main-body 100 is provided with a readout window 134 through which a document conveyed by the automatic document feeder 102 is read.

The automatic document feeder 102 is disposed on top of the reader-main-body 100 so as to automatically feed and convey a document. The automatic document feeder 102 includes a document tray 130, a conveying drum 132, a paper discharge roller 136, a discharged-paper tray 138, and other units. The automatic document feeder 102 conveys a document placed on the document tray 130 toward the conveying drum 132, and then the conveying drum 132 conveys the document toward the readout window 134. The document is exposed to light from the light source 109 when passing by the readout window 134. The light reflected from the document is reflected multiple times by the mirror 112 of the first carriage 108 and the mirrors 114 and 116 of the second carriage 110 and then condensed to form an image through the lens 118 on the light-receiving surface of the CMOS linear sensor 122 on the sensor board 120.

Furthermore, for the flat-bed reading, the document is placed to be stationary on the contact glass plate 104 and read by the first carriage 108 and the second carriage 110 being scanned across the document. In this case, the document on the contact glass plate 104 is irradiated with the light source 109 from below the contact glass plate 104. The light reflected from the document is reflected multiple times by the mirror 112 of the first carriage 108 and the mirrors 114 and 116 of the second carriage 110 and then condensed to form an image through the lens 118 on the light-receiving surface of the CMOS linear sensor 122 on the sensor board 120. At this time, the image reading apparatus 10 reads the entire document by the first carriage 108 traveling at a speed V in a sub-scanning direction of the document and the second carriage 110 traveling in response to the first carriage 108 at ($\frac{1}{2}$)V or half the speed of that of the first carriage 108.

Figure 2:
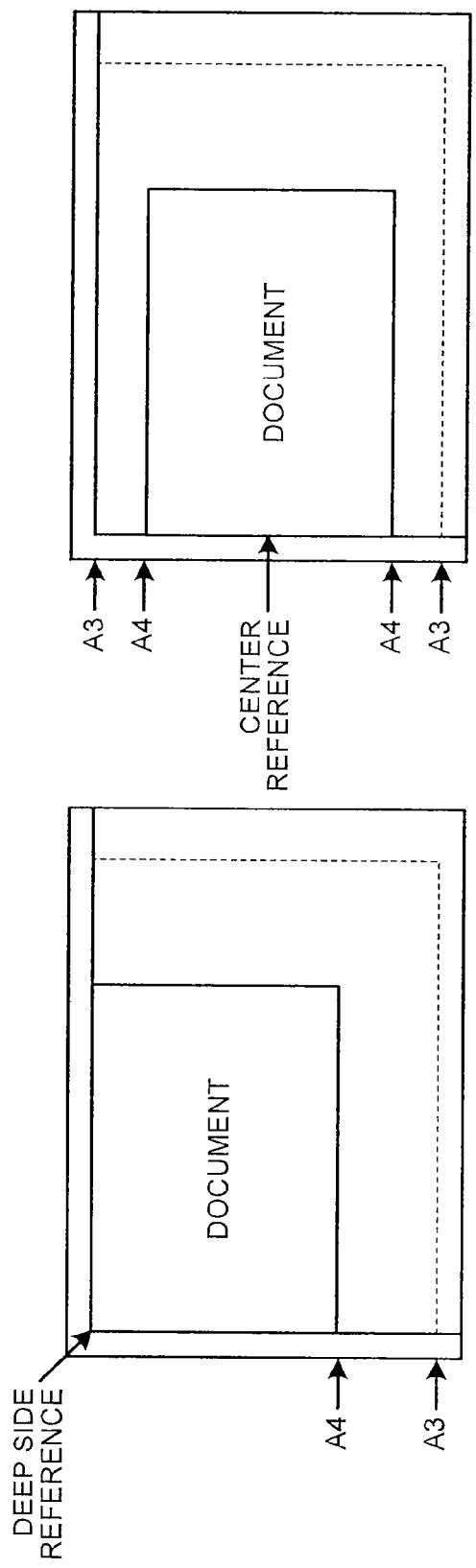
FIG. 2 a diagram illustrating positions of a document placed on the contact glass plate when the image reading apparatus reads the document.

FIG. 2 is a diagram illustrating positions of a document placed on the contact glass plate 104 when the image reading apparatus 10 reads the document. The image reading apparatus 10 reads documents of various sizes (for example, A3 and A4). Furthermore, the image reading apparatus 10 reads a document by various readout schemes such as the sheet through reading using the automatic document feeder 102 or inverting or non-inverting reading by the flat-bed reading. Furthermore, the image reading apparatus 10 also reads a document at different positions defined, for example, with respect to the deep side or the center.

Furthermore, when reading only required pixels in the main-scanning direction, the image reading apparatus 10 provides a reduced line period in order to decrease the time for processing.

Figure 3:
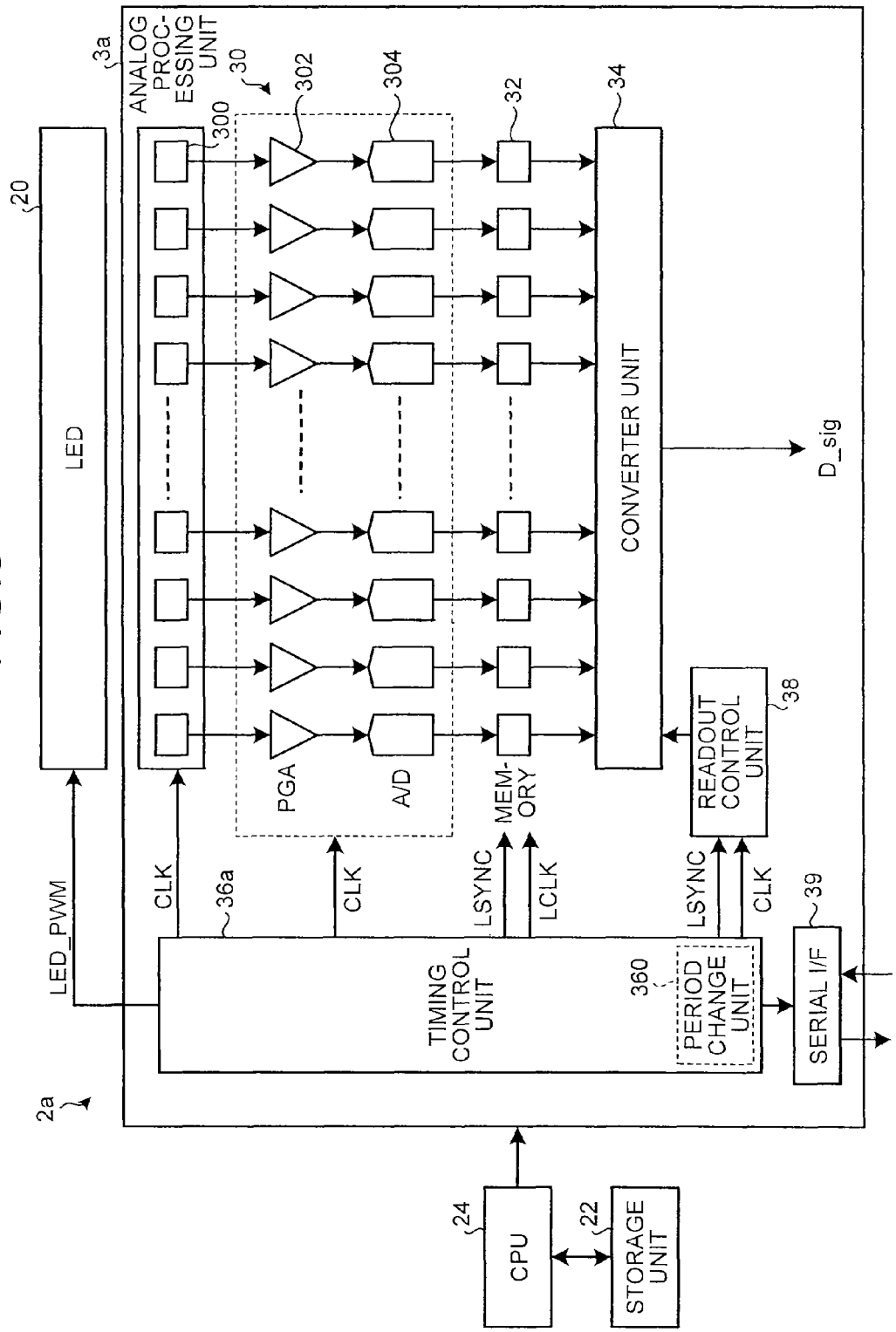
FIG. 3 is a block diagram illustrating an example of the configuration of an image reading apparatus according to the embodiment.

Now, an example of the configuration of an image reading apparatus according to an embodiment will be described in more detail. FIG. 3 is a block diagram illustrating an example of the configuration of the image reading apparatus according to the embodiment (an image reading apparatus 2a). The image reading apparatus 2a includes an LED 20, a photoelectric conversion device 3a, a storage unit 22, and a CPU 24.

The image reading apparatus 10 shown in FIG. 1 corresponds to the image reading apparatus 2a shown in FIG. 3. That is, the LED 20 corresponds to the light source 109 shown in FIG. 1 and irradiates a document with light. The photoelectric conversion device 3a corresponds to the CMOS linear sensor 122 shown in FIG. 1 and performs photoelectric conversion on the light reflected from the document. The storage unit 22 includes, for example, an HDD or a memory device. The CPU 24 controls each of the components that constitute the image reading apparatus 2a.

Now, the photoelectric conversion device 3a will be described in more detail. The photoelectric conversion device 3a is, for example, a CMOS linear image sensor including an analog processing unit 30, memory devices 32, a converter unit 34, a timing control unit 36a, a readout control unit 38, and a serial interface (I/F) 39.

The timing control unit 36a includes a period change unit 360 and produces, for example, clocks (CLK, LCLK) and a line sync signal (LSYNC) which are required for the operation of each component in the photoelectric conversion device 3a. The period change unit 360 changes the period of the line sync signal (LSYNC) based on the readout start pixel and the readout end pixel that are controlled by the readout control unit 38, to be discussed later.

For example, for each of 7000 pixels arranged in one direction, the analog processing unit 30 includes a light-receiving element (photodiode) 300 for receiving light, an amplifier (Programmable Gain Amplifier (PGA)) 302, and an AD converter 304. Namely, the photoelectric conversion device 3a includes the light-receiving elements 300, the amplifiers 302, and the AD converters 304, which are each 7000 in number.

The photoelectric conversion device 3a allows each of the light-receiving elements 300 to accumulate incident light as electric charge and a charge detection unit (not shown) to convert the charge into a voltage. The amplifiers 302 amplify the converted voltage (analog signal) for output to the AD converters 304. The AD converters 304 each convert analog signals or pieces of pixel data received from the amplifiers 302 into digital signals in parallel and then output the converted digital signals (digital data) to the memory devices 32.

The memory devices 32 store the digital data converted by the AD converters 304 pixel by pixel. The converter unit 34 reads the digital data stored in the memory devices 32 and converts the read digital data into serial data in the main-scanning direction to output. In short, the converter unit 34 performs parallel to serial conversion.

The readout control unit 38 changeably controls the readout start pixel and the readout end pixel of the serial data converted by the converter unit 34 in the main-scanning direction. For example, the readout control unit 38 changes the readout start pixel and the readout end pixel according to the readout scheme of the image reading apparatus 10. The serial I/F 39 performs, for example, serial communications with outside.

As described above, the period change unit 360 changes the period of the line sync signal (LSYNC) based on the readout start pixel and the readout end pixel controlled by the readout control unit 38, to be discussed later. Then, the period change unit 360 changes, for example, the period in which the light-receiving element 300 performs photoelectric conversion, the period in which the AD converter 304 performs AD conversion, the period in which the memory device 32 stores digital data, and the period in which the converter unit 34 converts digital data into serial data in the main-scanning direction.

Figure 4:
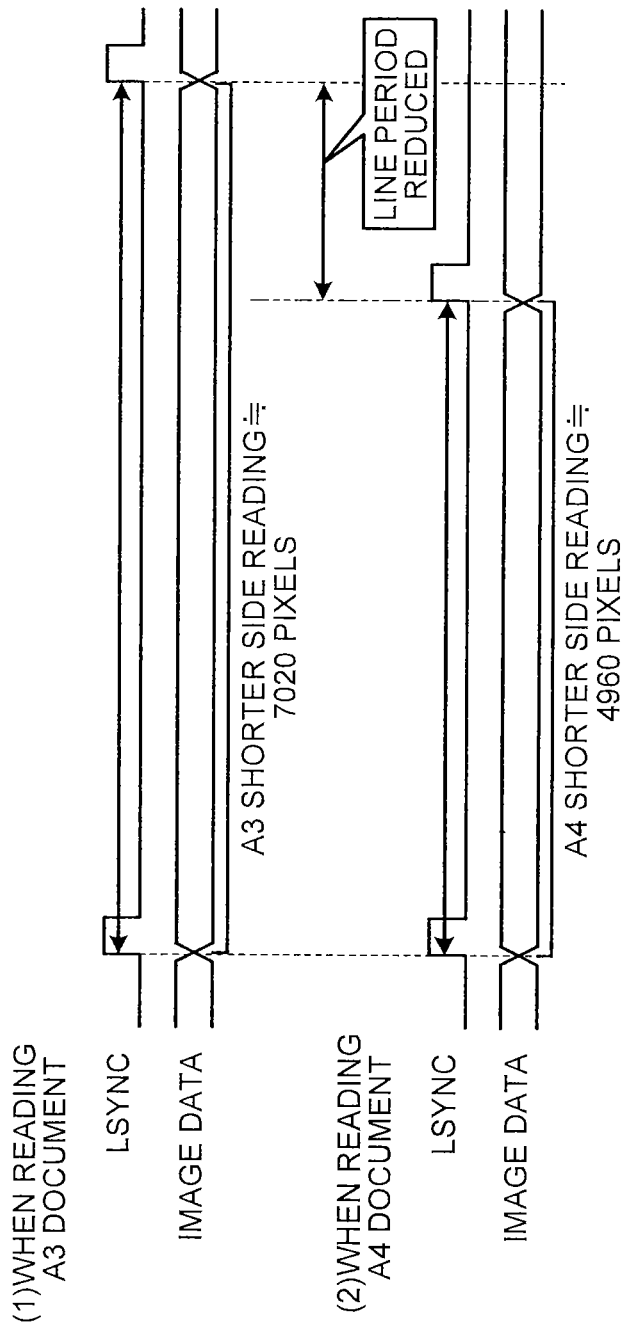
FIG. 4 is a timing chart illustrating an example of the operation of an image reading apparatus according to the embodiment.

FIG. 4 is a timing chart illustrating an operation example of the image reading apparatus 2a. Suppose that the image reading apparatus 2a is configured such that the photoelectric conversion device 3a includes, for example, the number of read pixels corresponding to 600 dpi for a document of an A3 shorter side size (297 mm: about 7020 pixels). When a document of an A4 shorter side size (210 mm: about 4960 pixels) is read, the photoelectric conversion device 3a sets the readout end pixel position to 1/(the positive square root of 2) times a value given when the A3 shorter side is read. That is, the photoelectric conversion device 3a performs reading of 210/

297 times the A3 shorter side size and thus reads no unnecessary pixels. Note that the positive square root of 2 will be hereafter denoted as sqrt2.

On the other hand, the photoelectric conversion device 3a reduces the line period according to a decrease in the number of read pixels. That is, the photoelectric conversion device 3a can reduce the reading time of one line in the main-scanning direction by 1/sqrt2 (=210/297) times.

As described above, the image reading apparatus 2a changes the readout end pixel depending on the document size to be read, whereby the line period can be reduced depending on the number of read pixels without reading unnecessary pixels. Note that in practice, although the image reading apparatus 2a needs to read OPB pixels and invalid pixels in addition to effective pixels, a description is made only to the effective pixels for simplicity in this embodiment.

Furthermore, in the example shown in FIG. 4, the image reading apparatus 2a allows a document to be placed with respect to the deep side for the flat-bed reading or the sheet through reading. For example, when the document is placed with respect to the center, the image reading apparatus 2a changes the readout start pixel and the readout end pixel of the document depending on the document size.

Furthermore, the image reading apparatus 2a may employ opposite main-scanning directions because different orientations of the document and different scanning schemes are employed for the flat-bed reading and the sheet through reading. In this case, the image reading apparatus 2a is adapted such that pixels not required to be read are placed at opposite positions when the size of the document in the main-scanning direction is less than the size of a readable document. For example, when the 5000th to 7000th pixels of the photoelectric conversion device 3a are unnecessary for the flat-bed reading, the 0th to 2000th pixels are unnecessary for the sheet through reading. The image reading apparatus 2a can change the line period without reading unnecessary pixels depending on the readout scheme by the readout control unit 38 providing control to change the readout start pixel and the readout end pixel of serial data in the main-scanning direction based on a pre-determined setting or the result of photoelectric conversion performed by each of the light-receiving elements 300.

First Modified Example

Figure 5:
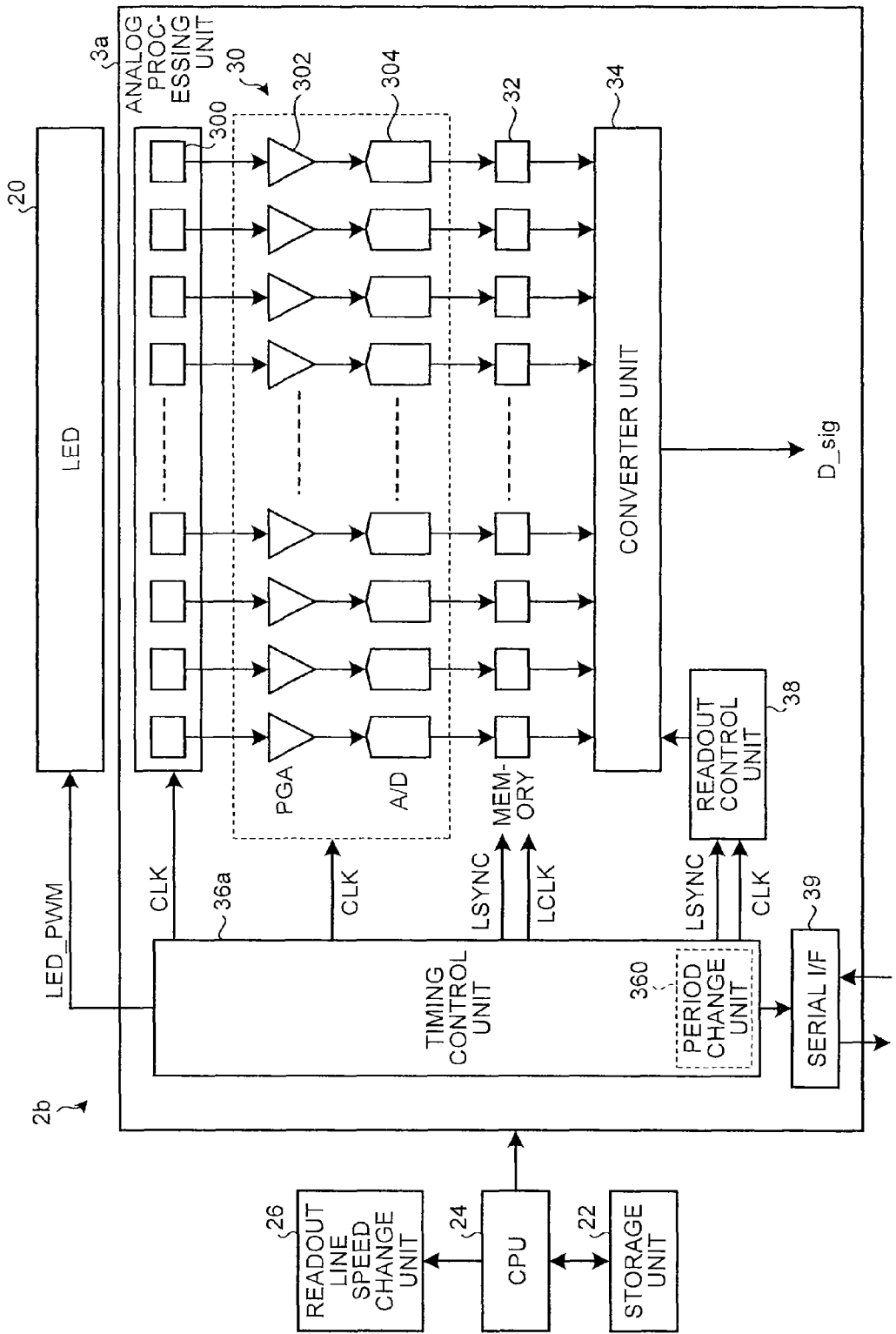
FIG. 5 is a block diagram illustrating a first modified example of the image reading apparatus shown in FIG. 3.

FIG. 5 is a block diagram illustrating a first modified example (an image reading apparatus 2b) of the image reading apparatus 2a shown in FIG. 3. As shown in FIG. 5, the image reading apparatus 2b has a readout line speed change unit 26 in addition to each of the components constituting the image reading apparatus 2a shown in FIG. 3. Depending on the period changed by the period change unit 360, the readout line speed change unit 26 changes the readout line speed at which each of the light-receiving elements 300 sequentially performs photoelectric conversion on the light reflected from different positions in the sub-scanning direction. More specifically, the readout line speed change unit 26 changes the conveying speed of the document for the sheet through reading, while changing the scanning speed of the carriage (not shown) for the flat-bed reading.

For example, as with the operation shown in FIG. 4, the image reading apparatus 2b with the photoelectric conversion device 3a capable of reading a document of an A3 shorter side size in the main-scanning direction requires the number of (1/sqrt2) times pixels and a (1/sqrt2) times line period for reading a document of an A4 shorter side size. That is, the image reading apparatus 2b is configured such that the document conveying speed for the sheet through reading or the scanning speed of the carriage for the flat-bed reading is increased by sqrt2 times, thereby providing the optimum relation between the line period and the readout line speed. Therefore, when compared with reading an A3 document of pixel data, the image reading apparatus 2b can read the A4 document at a speed sqrt2 times faster (improve productivity).

Here, the image reading apparatus 2b controls the readout control unit 38 to change the readout start pixel and the readout end pixel of serial data in the main-scanning direction based on a pre-determined setting or the result of photoelectric conversion performed by each of the light-receiving elements 300. For example, the image reading apparatus 2b may also be adapted to store in advance a plurality of readout start pixel and readout end pixel setting values in the storage unit 22 or a register (not shown) in order to select a setting value depending on the setting of a readout scheme. That is, the storage unit 22 or the register or the like serves as a setting storage unit for storing in advance two or more settings of the settings of the readout start pixel and the readout end pixel of serial data in the main-scanning direction and the setting of the period changed by the period change unit.

FIG. 6 is a view illustrating a plurality of example setting values, such as a plurality of readout start pixels and readout end pixels, which the image reading apparatus 2b stores in the register. For example, the image reading apparatus 2b has the readout start pixel, the readout end pixel, and the line period register ([rdout_str_0] to [rdout_str_5], [rdout_end_0] to [rdout_end_5], and [lineint_0] to [lineint_5]), which are associated with the six-type readout schemes, respectively, and the registers ([rdout_sel_0] to [rdout_sel_5]) indicating the respective readout schemes. The image reading apparatus 2b may be configured to be provided at start-up with a setting which is included in [rdout_str_0] to [rdout_str_5], [rdout_end_0] to [rdout_end_5], and [lineint_0] to [lineint_5] and which is associated in advance with one of application examples.

For example, when starting to read images on a document of size A4, the image reading apparatus 2b can set so that [rdout_sel]=1 h, thereby reflecting the values set to the readout start pixel=[rdout_str_1], the readout end pixel=[rdout_end_1], and the line period=[lineint_1].

Second Modified Example

Figure 7:
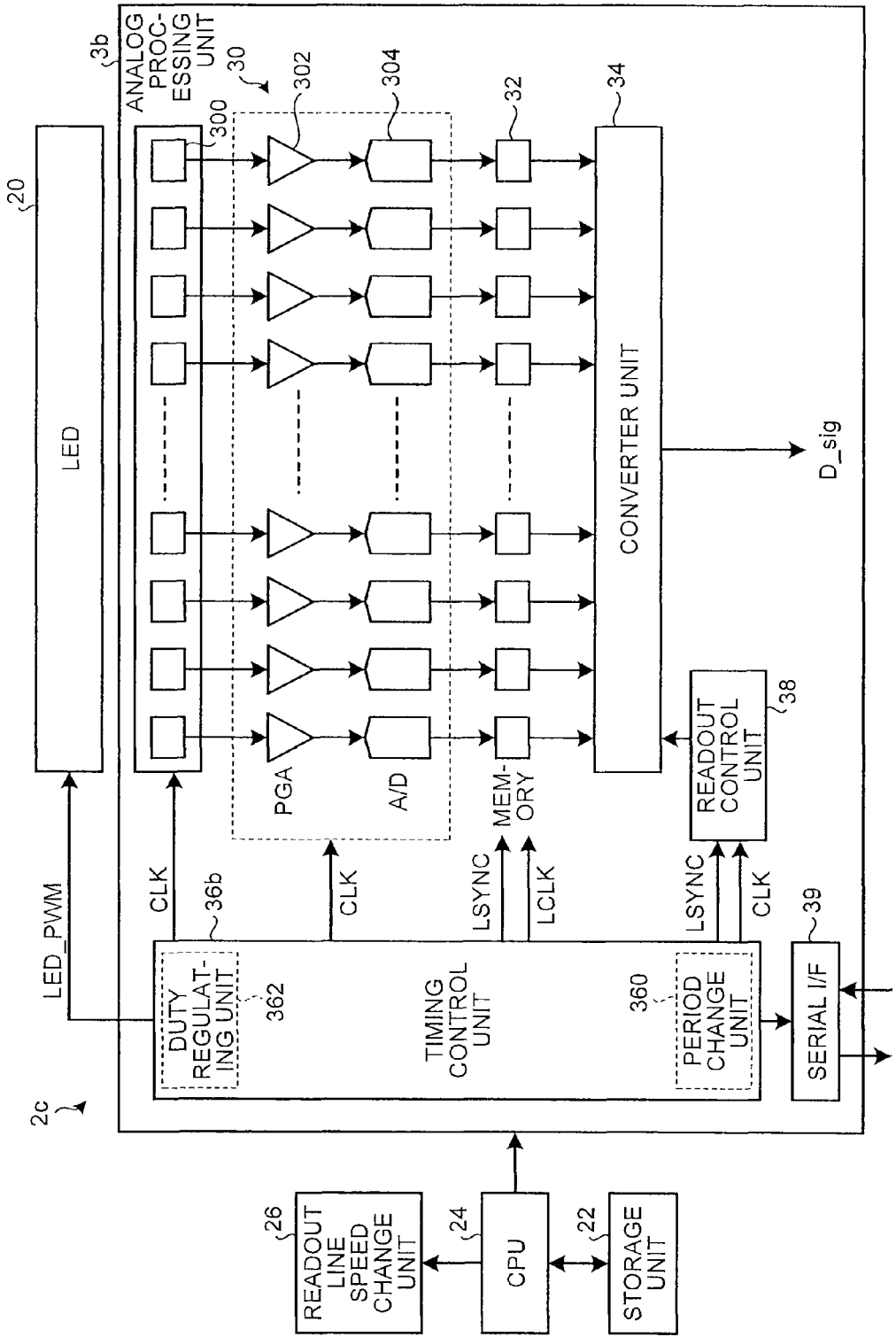
FIG. 7 is a block diagram illustrating a second modified example of the image reading apparatus shown in FIG. 3.

FIG. 7 is a block diagram illustrating a second modified example (an image reading apparatus 2c) of the image reading apparatus 2a shown in FIG. 3. As shown in FIG. 7, the image reading apparatus 2c is adapted such that the photoelectric conversion device 3a of the image reading apparatus 2b shown in FIG. 5 is replaced with a photoelectric conversion device 3b. The photoelectric conversion device 3b includes a duty regulating unit 362 added to the photoelectric conversion device 3a.

The duty regulating unit 362 changes the duty ratio of a drive signal for turning on the LED 20 according to the period changed by the period change unit 360, thereby regulating the quantity of light from the LED 20. More specifically, in a case where the ratio of the active duration to the negative duration is 50%:50% for reading an A3 document, the duty regulating unit 362 changes the ratio between the active duration and the negative duration to about 70%:30% when the period change unit 360 has changed the line period by (1/sqrt2) times for reading an A4 document. Therefore, the image reading apparatus 2c can prevent a decrease in the amount of charge to be accumulated by the photoelectric conversion device 3b during processing of one line in the main-scanning direction, thus maintaining the quality (S/N ratio) of the image data.

Figure 8:
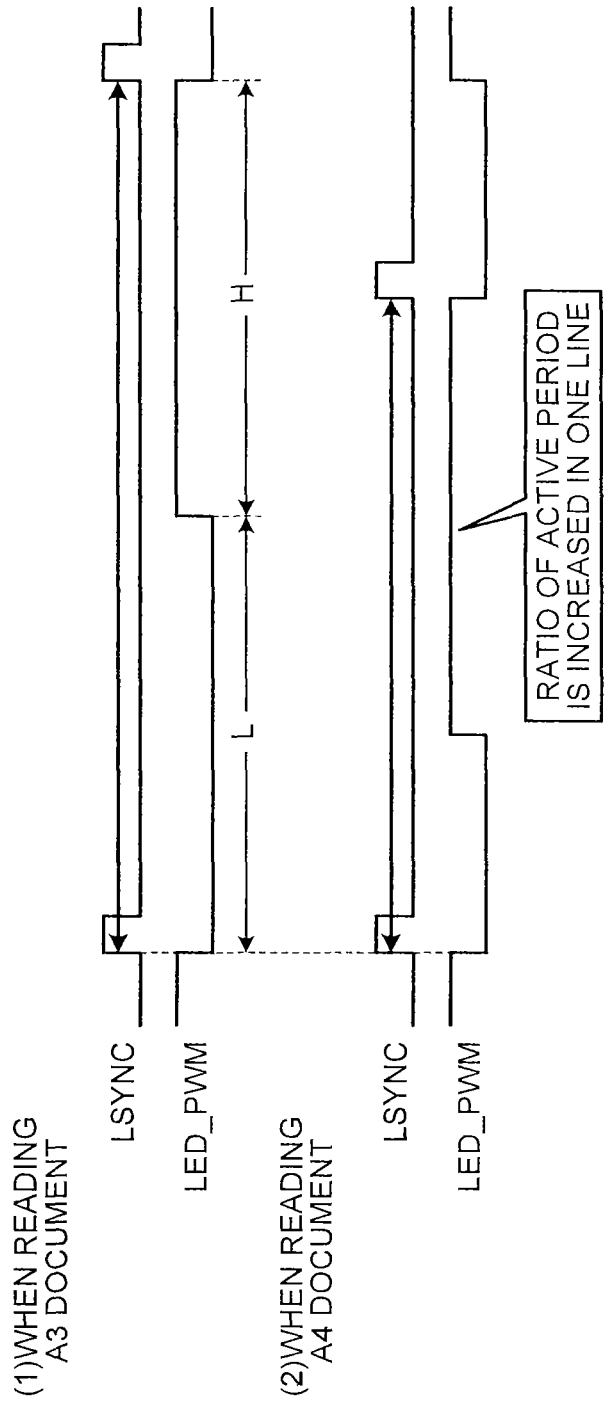
FIG. 8 is a timing chart illustrating a first operation example of a duty regulating unit.

FIG. 8 is a timing chart illustrating a first operation example of the duty regulating unit 362. As shown in FIG. 8, the duty regulating unit 362 changes, for example, the duty ratio of a drive signal (LED_PWM) for turning on the LED 20, thereby regulating the quantity of light from the LED 20. Here, the duty regulating unit 362 changes part of an L duration (negative duration) to an H duration (active duration) in order to increase the H duration (active duration) of the LED_PWM.

Figure 9:
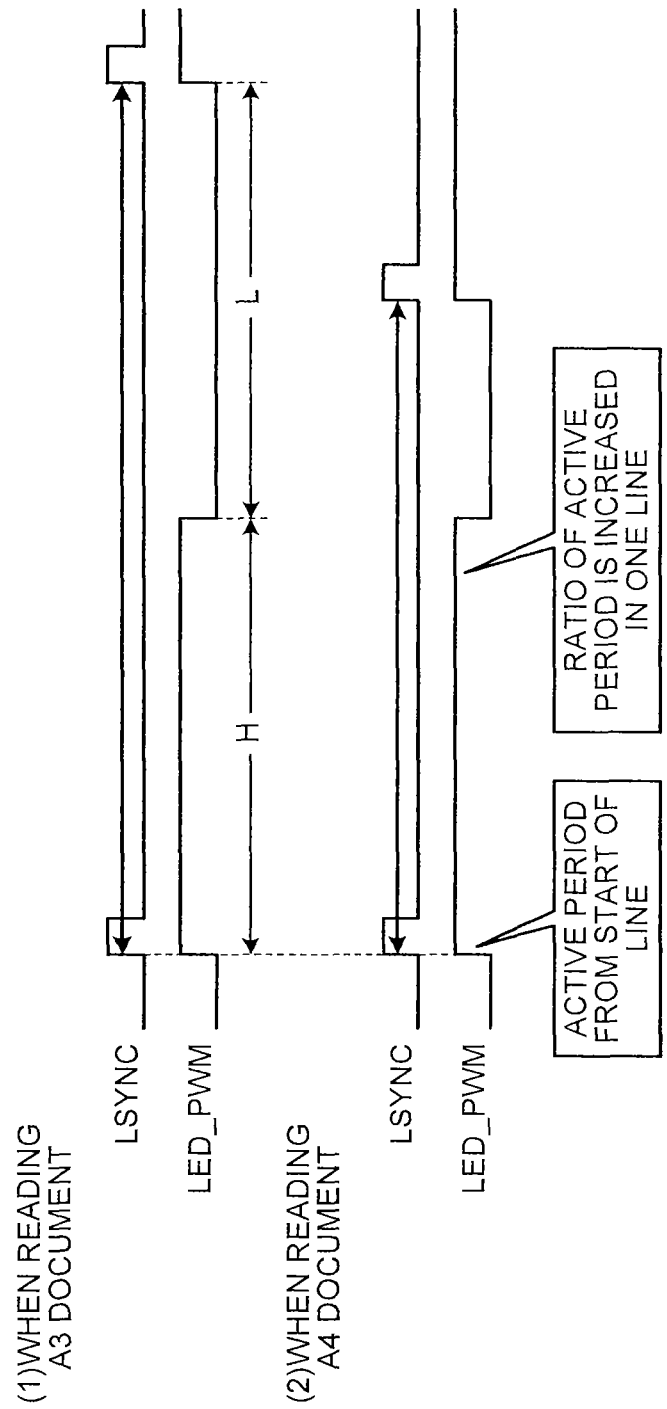
FIG. 9 is a timing chart illustrating a second operation example of the duty regulating unit.

FIG. 9 is a timing chart illustrating a second operation example of the duty regulating unit 362. As shown in FIG. 9, the duty regulating unit 362 allows, for example, the LED 20 to be turned on by a drive signal (LED_PWM) that is activated at the start of one line (at start-up). That is, the duty regulating unit 362 reduces the L duration (negative duration) according to the line sync signal (LSYNC), thereby increasing the percentage of the H duration (active duration) without changing the H duration.

Third Modified Example

Figure 10:
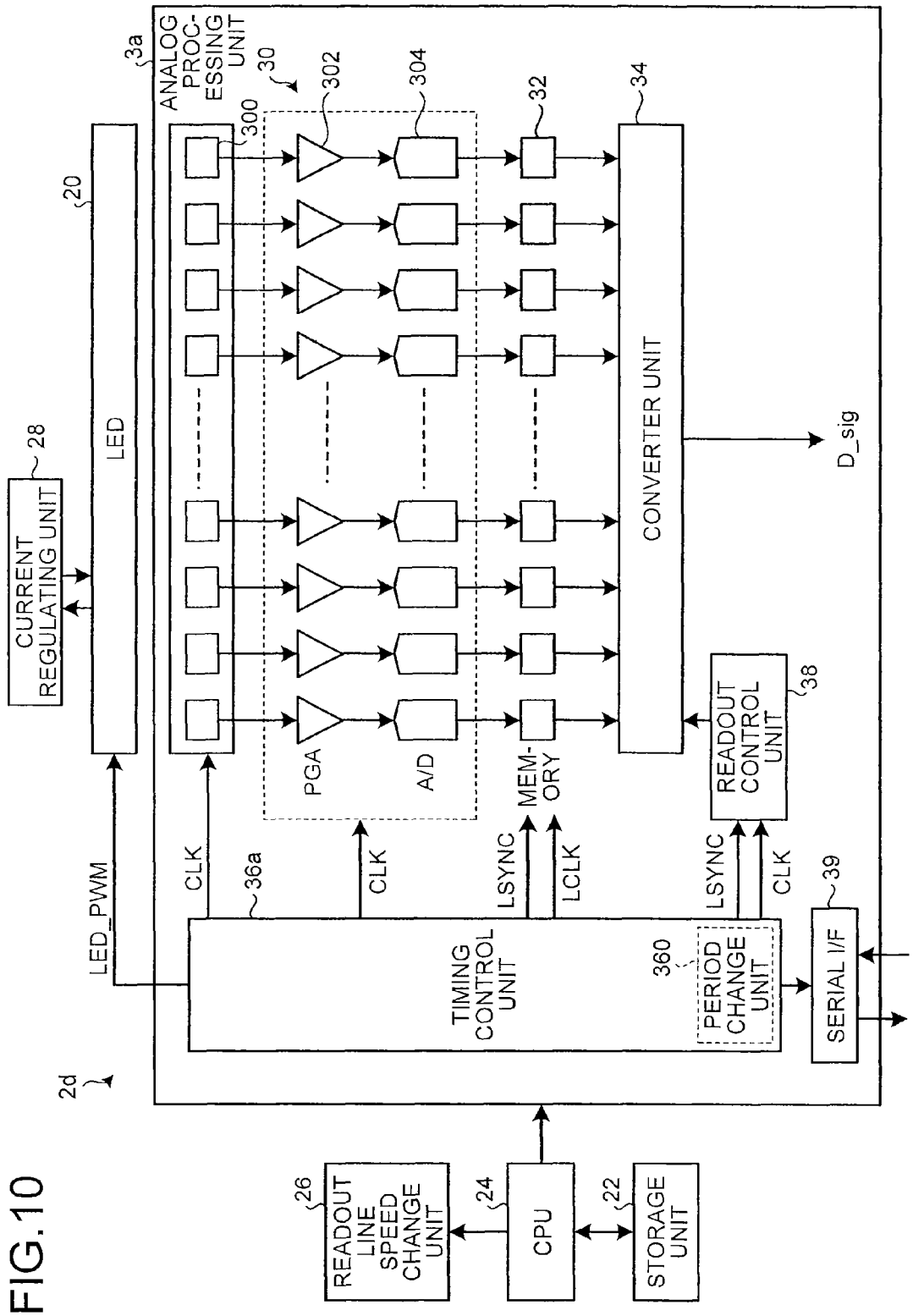
FIG. 10 is a block diagram illustrating a third modified example of the image reading apparatus shown in FIG. 3.

FIG. 10 is a block diagram illustrating a third modified example (an image reading apparatus 2d) of the image reading apparatus 2a shown in FIG. 3. As shown in FIG. 10, the image reading apparatus 2d includes a current regulating unit 28 added to the image reading apparatus 2b shown in FIG. 5.

The current regulating unit 28 changes the amount of current of a drive signal for turning on the LED 20, thereby regulating the quantity of light from the LED 20. That is, the image reading apparatus 2d can prevent a decrease in the quantity of light from the LED 20 even when the quantity of light has not been sufficiently regulated only by changing the duty ratio of the drive signal for turning on the LED 20.

Figure 11:
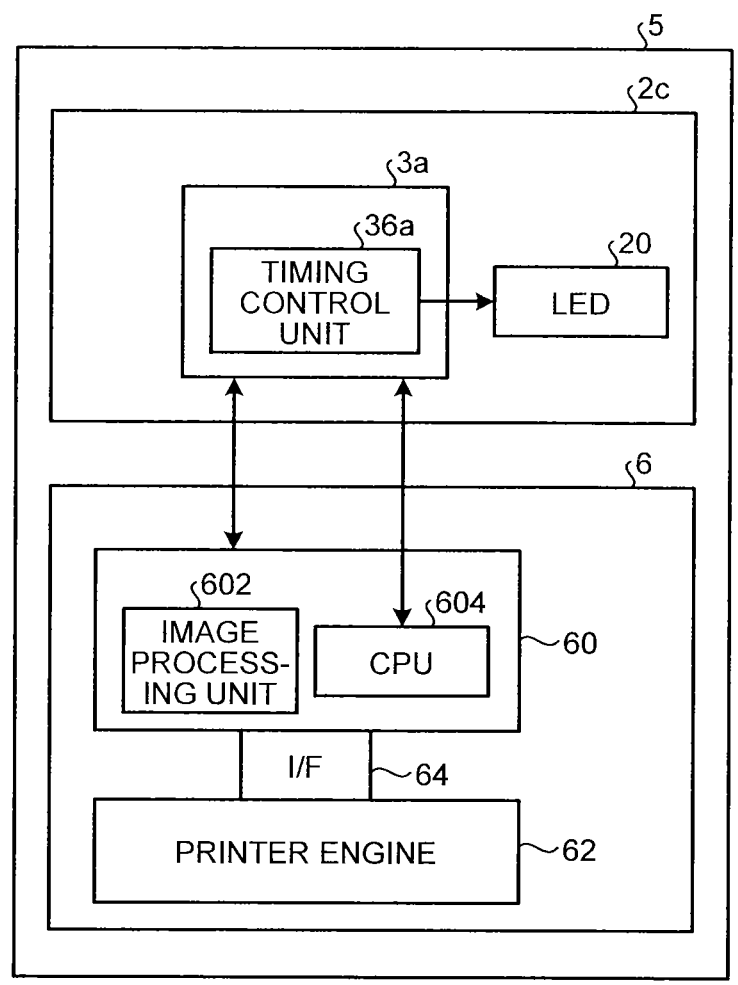
FIG. 11 is a view schematically illustrating an image forming apparatus that includes an image reading apparatus.

Now, a description will be made to an image forming apparatus 5 that includes the image reading apparatus 2c. FIG. 11 is a view schematically illustrating the image forming apparatus 5 that includes the image reading apparatus 2c. The image forming apparatus 5 is, for example, a copier or a multifunction peripheral (MFP), which has the image reading apparatus 2c and an image forming unit 6.

The image reading apparatus 2c includes the photoelectric conversion device 3a, the LED 20, and the like. The LED 20 irradiates a document with light. Then, the photoelectric conversion device 3a performs photoelectric conversion, AD conversion, and parallel serial conversion, and after that, outputs image data to the image forming unit 6.

The image forming unit 6 includes a processing unit 60 and a printer engine 62, with the processing unit 60 and the printer engine 62 being connected to each other through an interface (I/F) 64.

The processing unit 60 includes an image processing unit 602 and a CPU 604. The CPU 604 controls each of the components, such as the photoelectric conversion device 3a, which constitute the image forming apparatus 5.

The image processing unit 602 performs image processing on image data outputted by the image reading apparatus 2c, then outputting the resulting image data, for example, to the printer engine 62. The printer engine 62 prints the received image data.

The present invention provides the effect of enabling required pixels to be read with efficiency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
  a plurality of light-receiving elements configured to be arranged side by side in a main-scanning direction and to perform photoelectric conversion pixel by pixel;
  a plurality of AD converter units configured to convert each piece of analog data received from the plurality of light-receiving elements into parallel pieces of digital data;
  a storage unit configured to store therein each of the parallel pieces of digital data converted by the plurality of AD converter units;
  a converter unit configured to read the digital data stored in the storage unit and convert the read digital data into serial data in the main-scanning direction;
  a readout control unit configured to changeably control a readout start pixel and a readout end pixel of the serial data converted by the converter unit in the main-scanning direction; and
  a period change unit configured to change a period in which the converter unit converts the digital data into serial data in the main-scanning direction based on the readout start pixel and the readout end pixel controlled by the readout control unit.

2. The image reading apparatus according to claim 1, wherein
  the readout control unit provides control so as to change the readout start pixel and the readout end pixel of the serial data in the main-scanning direction based on a predetermined setting or a result of the photoelectric conversion performed by the plurality of light-receiving elements.

3. The image reading apparatus according to claim 1, further comprising a readout line speed change unit configured to change a readout line speed at which the plurality of light-receiving elements sequentially perform photoelectric conversion on light from different positions in a sub-scanning direction in response to the period changed by the period change unit.

4. The image reading apparatus according to claim 1, further comprising a setting storage unit configured to store therein in advance two or more settings of the readout start pixel and the readout end pixel of the serial data in the main-scanning direction and the period changed by the period change unit, wherein
  the readout control unit controls to change the readout start pixel and the readout end pixel of the serial data in the main-scanning direction based on the settings stored in the setting storage unit, and
  the period change unit changes the period in which digital data is converted into serial data in the main-scanning direction based on the settings stored in the setting storage unit.

5. The image reading apparatus according to claim 1, further comprising:
  a light source configured to irradiate a document with light; and
  a regulating unit configured to regulate a quantity of light from the light source in response to the period changed by the period change unit.

6. The image reading apparatus according to claim 5, wherein
  the light source is an LED, and
  the regulating unit changes a duty ratio of a drive signal for turning on the LED, thereby regulating the quantity of light from the light source.

7. The image reading apparatus according to claim 6, wherein
the regulating unit changes the duty ratio of the drive signal that has been first activated, thereby regulating the quantity of light from the light source.

8. The image reading apparatus according to claim 5, wherein
the light source is an LED, and
the regulating unit changes an amount of current of a drive signal for turning on the LED, thereby regulating the quantity of light from the light source.

9. An image forming apparatus including an image reading apparatus, wherein
the image reading apparatus comprises:
a plurality of light-receiving elements configured to be arranged side by side in a main-scanning direction and to perform photoelectric conversion pixel by pixel;
a plurality of AD converter units configured to convert each piece of analog data received from the plurality of light-receiving elements into parallel pieces of digital data;
a storage unit configured to store therein each of the parallel pieces of digital data converted by the plurality of AD converter units;
a converter unit configured to read the digital data stored in the storage unit and convert the read digital data into serial data in the main-scanning direction;
a readout control unit configured to changeably control a readout start pixel and a readout end pixel of the serial data converted by the converter unit in the main-scanning direction; and
a period change unit configured to change a period in which the converter unit converts the digital data into serial data in the main-scanning direction based on the readout start pixel and the readout end pixel controlled by the readout control unit.

10. A method for reading an image, the method comprising:
converting each piece of analog data into parallel pieces of digital data, the analog data being received from a plurality of light receiving elements arranged side by side in a main scanning direction;
storing each of the converted parallel pieces of digital data;
changeably controlling a readout start pixel and a readout end pixel in the main-scanning direction;
reading the stored digital data from the controlled readout start pixel to the controlled readout end pixel and converting the read digital data into serial data in the main-scanning direction; and
changing a period in which the digital data is converted into serial data in the main-scanning direction based on the controlled readout start pixel and the controlled readout end pixel.

11. The image reading apparatus according to claim 1, wherein the analog data is amplified by a plurality of amplification units prior to being converted to said parallel pieces of digital data by the plurality of AD converter units.

12. The image reading apparatus according to claim 1, wherein the period change unit changes a second period in which the plurality of light-receiving elements perform photoelectric conversion, a third period in which the plurality of AD converter units convert said each piece of analog data into said parallel pieces of digital data, and a fourth period in which the storage unit stores the digital data.

* * * * *